Patented Nov. 6, 1951

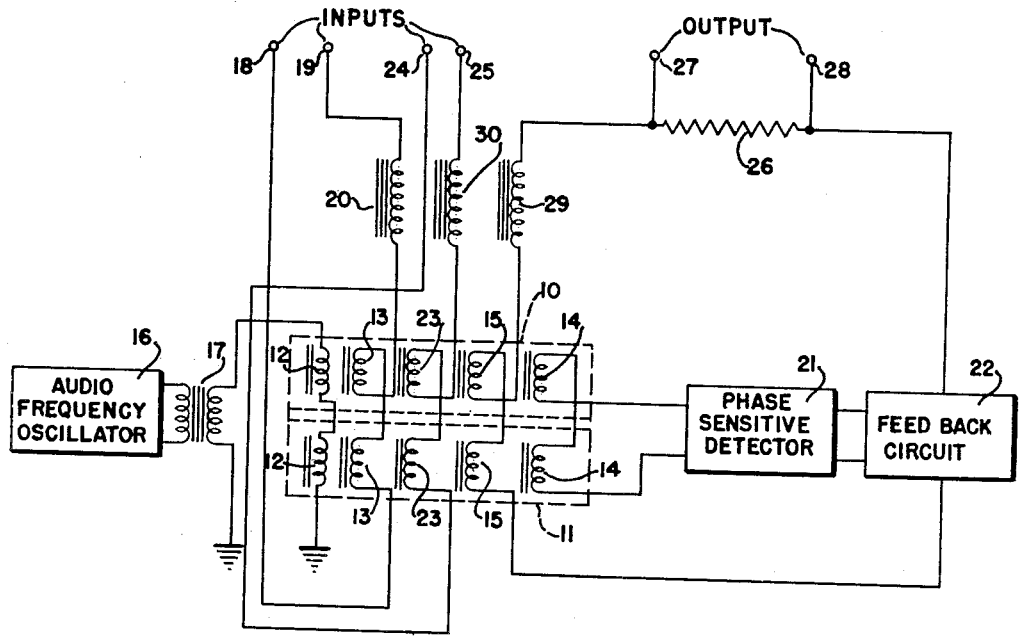

2,574,438

UNITED STATES PATENT OFFICE 2,574,438

COMPUTER USING MAGNETIC AMPLIFIER

Bruno Rossi, Winchester, Mass., Henri S. Sack, Ithaca, N. Y., Robert T. Beyer, Providence, R. I., and Glenn H. Miller, Rochester, N. Y., assignors to the United States of America as represented by the Secretary of the Navy Application July 3, 1946, Serial No. 681,186

9 Claims. (Cl. 171—97)

This invention relates in general to electrical computers and more particularly to electrical computers using a magnetic amplifier.

A usual requirement of an electrical computer is that it be capable of performing an algebraic addition of currents and potentials and presenting the result in some usable fashion. Various methods have been used to perform this function, mainly with the aid of electronic apparatus containing precision circuit elements. The present invention makes use of a magnetic amplifier which requires no precision components to effect the solution of the computer problem. The basic theory of the magnetic amplifier is treated fully in copending application Serial No. 679,596, filed June 27, 1946, by Bruno Rossi, Glenn H. Miller, Robert T. Beyer, and Henri S. Sack.

The primary object of this invention is to provide a computing device.

A further object of this invention is to provide a device to perform the algebraic addition of two or more currents.

Another object of this invention is to provide a device to perform the algebraic addition of two or more potentials.

Still another object is to provide a device not requiring precision components to perform the algebraic addition of currents or potentials.

These and other objects will be apparent from the detailed description when taken with the accompanying drawing which is a schematic diagram of one embodiment of the present invention.

Essentially a magnetic amplifier operates on the principle that when both an alternating and direct magnetizing force are applied to the primary winding of a transformer having a ferromagnetic core, even harmonics, principally the second, of the applied alternating magnetizing force appear across the secondary of the transformer, the amplitude of the second harmonic, as a first approximation, being directly proportional to the magnitude of the current flowing in the primary winding due to the direct magnetizing force. In order to separate the even harmonics, and particularly the second, from the fundamental and other odd harmonics, two identical transformers are used, the primary, or alternating current winding, the direct current windings, and the pick-up windings being so connected on the two cores that the fundamental cancels out across the two pick-up windings, whereas the second harmonic due to the direct magnetizing force will add. The second harmonic output of the secondary is then used, after amplification, as a measure of the direct current. The operation of this circuit will be more clearly understood by reference to the appended drawing.

As was previously mentioned, the basis of the magnetic amplifier lies in the characteristics of non-linear transformers 10 and 11, the two transformers being connected as shown in the circuit diagram. In the basic amplifier circuit, the transformers are wound with primary windings 12, secondary direct magnetizing or D. C. bias windings 13, pick-up windings 14, and for added sensitivity and stability, a compensation winding 15. An alternating voltage of constant frequency and of sufficient amplitude to cause operation of the transformers in their saturation region is applied to primary windings 12 of transformers 10 and 11 from audio frequency oscillator 16 through matching transformer 17. The direct magnetizing force necessary for operation is produced by a current flowing through input windings 13, the input terminals being 18 and 19. A choke coil 20 is inserted in series with windings 13 to prevent alternating fluctuations in these windings. With pick-up windings 14 connected as shown, the second harmonic of the applied alternating voltage appears at their output terminals. This output is applied to phase-sensitive detector 21, where the alternating voltage is rectified, resulting in a differential direct voltage output. This output could be used as a measure of the direct current in windings 13, but because the range of linearity between the amplitude of the second harmonic and the direct current is limited, a feedback system is used to circumvent this difficulty. The output of detector 21 is applied to feedback circuit 22, which may be a D. C. differential amplifier or a differential cathode follower. The feedback circuit produces a current flow in compensation windings 15 in such a way that it opposes the effect of the direct current in secondary windings 13. If the overall amplification of the circuit is sufficiently high, the magnitude of the compensation current will then be proportional, with a high degree of precision, to the input direct current in windings 13.

The circuit described above can be used for the algebraic addition of currents or potentials in the following way. Instead of one input secondary winding as illustrated by winding 13, a number of such secondary windings are placed on the transformers, the number of windings being equal to the number of currents or potentials to be added. One additional winding 23 with input terminals 24 and 25 and series choke coil 30 is shown on the accompanying drawing. If the current in each of the input windings is $I_m$ and the number of turns in each winding is $N_m$, and if furthermore, the overall amplification of the circuit is $k$, and $I_c$ and $N_c$ are the compensation current and the number of turns in the compensating winding, respectively, then $$I_c = \frac{k \Sigma N_m I_m}{\Sigma N_m + k N_c}$$

If the amplification $k$ is sufficiently large, this means that the compensation current is substantially equal to $$I_c = \frac{\Sigma N_m I_m}{N_c}$$

If the number of turns of all windings are identical, then the compensation current is directly the algebraic sum of the input currents. The simplest method to derive a usable measurement of this summation is to insert resistance 26 in series between feedback circuit 22 and compensating windings 15, the potential measured between terminals 27 and 28 being proportional to the added currents. Choke coil 29 is also inserted in series to prevent the flow of alternating current to the feedback circuit.

Other methods apparent to those skilled in the art, can be used to utilize the output which is proportional to the summation of two or more currents. Similarly, it is not imperative that a separate feedback winding be added to the transformers, but the pick-up winding, (and also the primary winding if the center tap is available) can be used simultaneously as input or compensation winding, thus reducing the total number of windings required. Accordingly, the foregoing discussion of one embodiment of the invention should not be construed as a definition, but is merely illustrative of one form the invention may take.

What is claimed is:

1. A computer for the algebraic addition of currents or potentials comprising, two non-linear transformers each having a primary winding, a plurality of secondary windings, a pick-up winding, and a compensation winding, an audio frequency oscillator, the output of said oscillator being applied to said primary windings of said transformers, a corresponding plurality of input circuits, each corresponding pair of secondary windings on each transformer being connected in series and to a corresponding one of said input circuits, and a rectifying means for transforming to a direct voltage the alternating voltage induced in said pick-up windings, the output of said rectifying means being applied to said compensation windings, whereby the current in said compensation windings is proportional to the algebraic sum of the currents in said plurality of input circuits.

2. A computer for the algebraic addition of currents or potentials comprising, two non-linear transformers each having a primary winding, a plurality of secondary windings, a pick-up winding, and a compensation winding, an audio frequency oscillator, the output of said oscillator applied to the primary windings of said transformers connected in series, a corresponding plurality of input circuits, each corresponding pair of secondary windings on each transformer being connected in series and to a corresponding one of said input circuits, a phase-sensitive detector for rectifying the alternating voltage induced in said pick-up windings, and a feedback circuit, the output of said phase-sensitive detector being fed to said feedback circuit and the output of said feedback circuit being applied to said compensation windings, whereby the current in said compensation windings is proportional to the algebraic sum of the currents in said plurality of input circuits.

3. A computer for the algebraic addition of currents or potentials comprising, two non-linear transformers each having a primary winding, a plurality of secondary windings, a pick-up winding, and a compensation winding, an audio frequency oscillator, the fundamental frequency output of said oscillator being applied to said primary windings of said transformers connected in series, a corresponding plurality of input circuits each comprising a choke coil connected in series with each corresponding pair of secondary windings of each transformer, said pick-up windings being so connected in series that an induced voltage of the second harmonic of said oscillator output frequency appears across the series connection, a phase-sensitive detector so connected as to rectify the output of said pick-up windings, and a feedback circuit to which is applied the output of said phase-sensitive detector, and an impedance connected in series with said compensation windings to the output of said feedback circuit, whereby the potential developed across said impedance is proportional to the algebraic sum of the currents in said plurality of input circuits.

4. A magnetic amplifier computer comprising a pair of magnetic cores each having a primary winding, a plurality of secondary windings, a pick-up winding, and a compensation winding, means for applying an alternating voltage current which partially saturates said cores to said primary windings, a corresponding plurality of input circuits being serially connected with a corresponding serially connected pair of secondary windings, means connected to said pick-up windings for converting to a direct voltage the alternating voltage induced therein, means for applying said direct voltage across said compensation windings, the current in said compensation windings being proportional to the algebraic sum of the currents in said plurality of input circuits.

5. Apparatus for the algebraic addition of currents comprising, a pair of saturable magnetic cores each having a primary winding, a plurality of secondary windings, a pick-up winding and a compensation winding, means for applying the currents to be added to said plurality of secondary windings, means for applying an alternating voltage across said primary windings to produce a current therein which partially saturates said cores, means connected to said pick-up windings for rectifying the alternating voltage induced therein, and means for feeding back said rectified voltage to said compensation windings, the current in said compensation windings being proportional to the algebraic sum of the currents applied to said secondary windings.

6. Apparatus for the algebraic addition of currents comprising, a plurality of saturable cores, primary windings wound on said cores, a source of alternating current connected to said primary windings, a plurality of secondary windings wound on said cores, means for applying the currents to be added to said secondary windings, compensation windings and pick-up windings wound on said cores, means for rectifying the alternating voltage induced in said pick-up windings, and feedback means for coupling the output of said rectifying means to said compensation windings, the current in said compensation windings being proportional to the algebraic sum of said currents.

7. A computer for the algebraic addition of currents or potentials comprising, a magnetic amplifier including a pair of magnetic cores each having a primary winding, a compensation winding, a pick-up winding and a feedback circuit connected between said pick-up windings and said compensation windings, a plurality of secondary windings wound on said cores, a like plurality of input circuits connected to said secondary windings for applying thereto the currents to be added, and an impedance connected in said feedback circuit, the potential developed across said impedance being proportional to the algebraic sum of the applied currents.

8. A computer for the algebraic addition of currents comprising a magnetic amplifier having a pair of magnetic cores with compensation windings thereon and feedback means coupled to said compensation windings, a plurality of direct current magnetizing windings wound on said cores, a like plurality of input circuits coupled to said magnetizing windings for applying thereto the currents to be added, the current in said compensation windings being proportional to the algebraic sum of the currents in said magnetizing windings.

9. Apparatus in accordance with claim 8 including an impedance connected in series with said compensation windings, the potential developed thereacross being proportional to the algebraic sum of the currents in said magnetizing windings.

BRUNO ROSSI.
HENRI S. SACK.
ROBERT T. BEYER.
GLENN H. MILLER.

No references cited.